(12) United States Patent  
Steinborn et al.

(10) Patent No.: US 9,039,569 B2
(45) Date of Patent: May 26, 2015

(54) METHOD FOR CONTROLLING AN AUTOMATED TRANSMISSION

(75) Inventors: Mario Steinborn, Friedrichshafen (DE); Jochen Breuer, Tettnang (DE); Christoph Ruechardt, Bodolz (DE); Thomas Jaeger, Meckenbeuren (DE); Roland Mair, Tettnang (DE); Melchor Moro-Oliveros, Riva del Garda (IT)

(73) Assignee: ZF Friedrichshafen AG, Friedrichshafen (DE)

( * ) Notice: Subject to any disclaimer, the term of this patent is extended or adjusted under 35 U.S.C. 154(b) by 71 days.

(21) Appl. No.: 14/001,195

(22) PCT Filed: Mar. 2, 2012

(86) PCT No.: PCT/EP2012/053594
§ 371 (c)(1),
(2), (4) Date: Aug. 23, 2013

(87) PCT Pub. No.: WO2012/139814
PCT Pub. Date: Oct. 18, 2012

(65) Prior Publication Data
US 2014/0020371 A1 Jan. 23, 2014

(30) Foreign Application Priority Data
Apr. 11, 2011 (DE) .......................... 10 2011 007 105

(51) Int. Cl.
*F16H 61/28* (2006.01)
*F15B 15/00* (2006.01)
*F16H 61/04* (2006.01)

(52) U.S. Cl.
CPC ......... *F15B 15/00* (2013.01); *F16H 2061/2823* (2013.01); *F16H 2061/047* (2013.01); *F16H 61/2807* (2013.01); *F16H 2306/48* (2013.01)

(58) Field of Classification Search
CPC ....... F15B 15/00; B60W 10/02; B60W 10/10; B60W 10/11; B60W 10/111; B60W 10/113; B60W 10/115
See application file for complete search history.

(56) References Cited

U.S. PATENT DOCUMENTS 5,836,207 A  11/1998  Spooner et al.
6,116,391 A   9/2000  Kremmling et al.
(Continued)

FOREIGN PATENT DOCUMENTS

DE  43 20 353 A1  1/1994
DE  43 09 901 A1  9/1994
(Continued)

OTHER PUBLICATIONS

German Search Report Corresponding to 10 2011 007 105.9 mailed Jan. 12, 2012.
(Continued)

*Primary Examiner* — Jacob S Scott
(74) *Attorney, Agent, or Firm* — Davis & Bujold, P.L.L.C.; Michael J. Bujold

(57) ABSTRACT

A method of controlling an automated transmission for motor vehicles with one or several pressure activated positioning cylinders (6, 8, 20), via the assigned shift valves (10, 12), at least one main cut-off valve (4) which is positioned prior to the shift valves, and a control device for controlling the shift and main cut-off valves. The pressure requests, for the shifting, are determined and the respective main cut-off valves are triggered depending on the determined pressure requests. To enable a variable match of the supply pressure during transmission shifts, respective optimized pressures or pressure patterns are determined for certain shift scenarios which, for instance, consider a mass to be synchronized, the existence of a tooth-on-tooth position, or the like. Through this method, for instance, the load on shift elements, the shift timing, and the shift noise can be positively influenced.

2 Claims, 1 Drawing Sheet

(56) References Cited

U.S. PATENT DOCUMENTS

| | | |
|---|---|---|
| 7,559,875 B2 | 7/2009 | Steinhauser et al. |
| 8,078,370 B2 | 12/2011 | Petzold et al. |
| 8,240,444 B2 | 8/2012 | Ulbricht et al. |
| 2008/0171633 A1 | 7/2008 | Gansohr et al. |

FOREIGN PATENT DOCUMENTS

| | | |
|---|---|---|
| DE | 197 54 726 A1 | 6/1999 |
| DE | 696 25 937 T2 | 11/2003 |
| DE | 10 2005 052 824 A1 | 3/2007 |
| DE | 10 2006 009 609 A1 | 9/2007 |
| DE | 10 2006 031 380 A1 | 1/2008 |
| DE | 10 2006 031 382 A1 | 1/2008 |
| DE | 10 2006 040 476 A1 | 3/2008 |
| DE | 196 80 781 B4 | 4/2008 |
| DE | 10 2006 054 032 A1 | 5/2008 |
| EP | 1 055 847 A2 | 11/2000 |
| GB | 2 354 295 A | 3/2001 |
| GB | 2 369 657 A | 6/2002 |
| WO | 2007/099035 A1 | 9/2007 |
| WO | 2008/058856 A1 | 5/2008 |

OTHER PUBLICATIONS

German Search Report Corresponding to 10 2011 007 107.5 mailed Dec. 5, 2011.
International Search Report Corresponding to PCT/EP2012/053594 mailed May 30, 2012.
International Search Report Corresponding to PCT/EP2012/053597 mailed May 7, 2012.
Written Opinion Corresponding to PCT/EP2012/053594 mailed May 30, 2012.
Written Opinion Corresponding to PCT/EP2012/053597 mailed May 7, 2012.

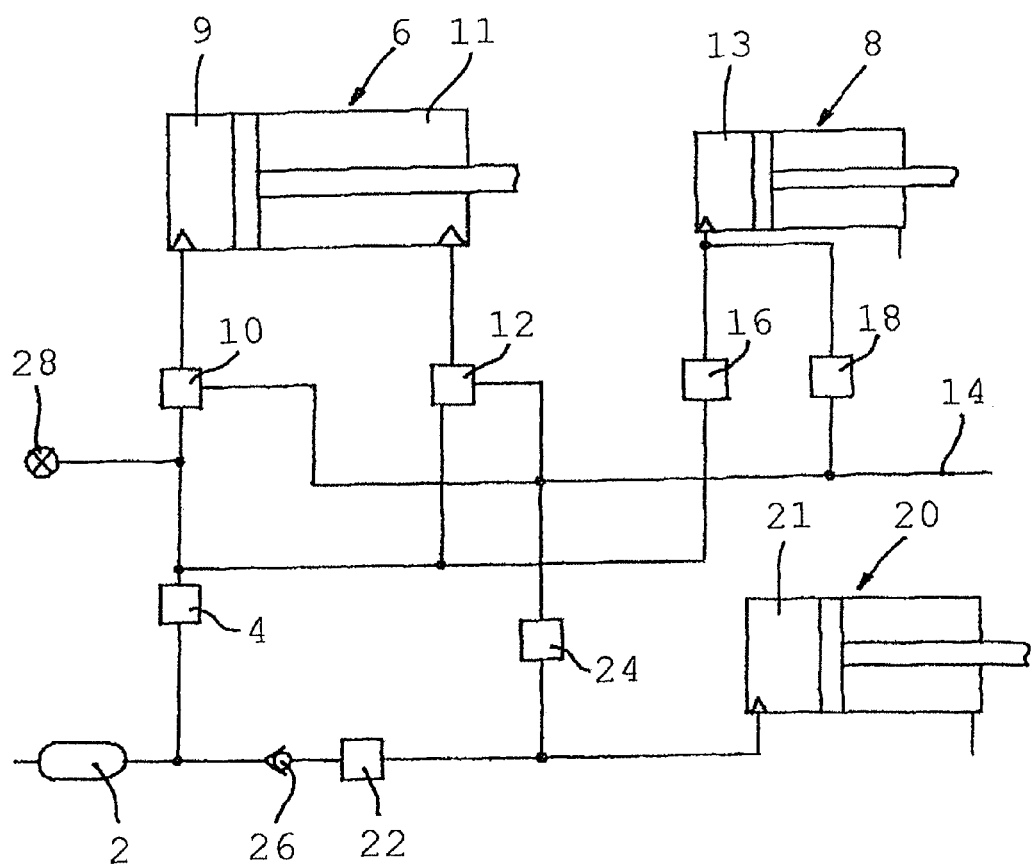

METHOD FOR CONTROLLING AN AUTOMATED TRANSMISSION

This application is a National Stage completion of PCT/EP2012/053594 filed Mar. 2, 2012, which claims priority from German patent application serial no. 10 2011 007 105.9 filed Apr. 11, 2011.

FIELD OF THE INVENTION

The invention concerns a method for controlling an automated transmission.

BACKGROUND OF THE INVENTION

Automated shift transmissions have been used for quite some time in the different motor vehicles. For instance, devices are provided to support the force of the shift elements during gear changes, in particular, shift transmissions in commercial vehicles which are designed as multi-group transmissions. Multi-group transmissions comprise two or more transmission groups, most likely configured in series, where their combination can create a large number of gear steps. They comprise, for instance, a split transmission as the input transmission and a main transmission or intermediate transmission, and a range transmission thereafter following as an output or a reduction transmission. Such shift transmissions offer especially detailed gear steps with twelve or sixteen gears, for instance. Compared to manual shift transmissions, they are characterized by a high operating comfort and are, in comparison to automatic transmissions, especially economical with regard to the manufacturing and operating costs.

For the execution of shift operations, such shift transmissions at least partially use the supply pressure of the vehicle in which they are installed. The shift elements, meaning the main cut-off valves and their following shift valves, for instance, are either directly supplied with this supply pressure or system pressure, respectively, or with a lowered constant upgrading pressure, for instance, via pressure reduction valves. That means that the load of the shift elements, the shift timing, the noise of the shifting, etc., can not, or only to a small extent, be influenced.

However, already known through DE 2006 040 476 A1 is a hydraulic or pneumatic control device, for an automatic shift transmission, in which the pressure can be controlled in a gear shift mechanism space which is designed as a pressure storage, which is positioned in front prior to the main cut-off valve or the main cut-off valves, respectively. Hereby, prior to a shift operation, the changing pressure requirement is estimated or a pressure drop in the system is calculated by means of a pressure sensor and, depending on the pressure requirement, one, two or more parallel positioned main cut-off valves will be opened to meet this pressure requirement. However, when the pressure requirement is estimated, this method is not precise or control of the main cut-off valves happens too late because the control can only be executed, for instance, when the pressure sensor has detected and processed a pressure drop in the system. In particular, this known method does not allow a variable match of the supply pressure to the particular special requirements of a certain shift scenario.

SUMMARY OF THE INVENTION

Based on the above, the invention has the task of creating a method for control of an automatic shift transmission which, for a certain dedicated shift scenario, enables an optimal matched pressure or pressure pattern, respectively.

The invention is based on a finding that the nominal pressure or nominal pressure pattern, respectively, can be determined for all, or at least all significant possible shift scenarios, so that, during initiation of a shift command via suitable pressure control mechanisms, this nominal pressure or nominal pressure pattern, respectively, is already known and accordingly can be manipulated or controlled.

Therefore, the invention is based on a method of the control of the automated shift transmission, with one or several hydraulic positioning cylinders with assigned shift valves, at least one, pre-positioned to the shift valves, main cut-off valve, and with a control device for control of the shift valves and the main cut-off valves, whereby the pressure requirements, for shift operations, are determined and where the respective main cut-off valves are operated depending on it.

For the solution of the given task, it is provided that the nominal pressure or nominal pressure pattern, respectively, at the shift valves for the different shift scenarios of the shift transmission is determined by consideration of one or several of the following criteria:

a) a mass to be synchronized with regard to a synchronous rotation speed which needs to be adjusted;
b) a desired variable nominal pressure over the synchronization pattern;
c) the condition of a tooth-on-tooth position of two gear wheels;
d) the shifting of a gear step into neutral;
e) the respective piston position in the positioning cylinder;
f) the desired piston speed in the positioning cylinder;
g) the desired piston acceleration in the positioning cylinder;
h) the respective gear step which needs to be shifted;
i) the requirement of substitution functions during problems with nominal functions;

and that the respective main cut-off valves are operated in accordance with this determined nominal pressure or nominal pressure pattern, respectively.

It is here noted that additional shift scenarios are possible for which the respective nominal pressure or nominal pressure patterns, respectively, can be determined but do not need to be listed for each single case.

With regard to the above mentioned criteria, please note the following: the larger the mass which needs to be synchronized, the nominal pressure is increasingly higher. For instance, at the beginning, the synchronization pattern shall show a load nominal pressure, the nominal pressure shall increase during the further course, and the nominal pressure shall be lowered toward the end of the synchronization pattern to guarantee a low load of the shift elements. To solve comfortably a tooth-on-tooth positioning, the nominal pressure needs to be lowered, to solve fast a tooth-on-tooth positioning, the nominal pressure needs to be increased. During shifting from a gear step to neutral, a nominal pressure is varied, depending on the drive train torque which is still present and/or its gradient during the shifting. Different nominal pressures are required for the synchronization as well as the shifting and the respective piston position in the shift cylinder, on one hand, or for the plain shifting and the respective piston position in the shift cylinder, on the other hand, respectively. The nominal pressure is varied, via the shift pattern, to maintain a pre-determined piston speed in the shift cylinder. The nominal pressure is varied via the shift pattern to achieve a pre-determined piston acceleration in the shift cylinder. Different gear steps require different nominal pressures. Substitution functions are provided as problems occur with the mentioned nominal functions, for instance, during turn-off problems, synchronization problems, or turn-on problems.

In accordance with an embodiment of the invention, it is provided that the mentioned criteria are weighted, against one another, and accordingly are based with regard to pre-determined priorities for the respective shift operation. Thus, if several of the above mentioned criteria are present during a certain shift operation, the pre-determined priorities are considered.

In accordance with another embodiment of the invention, the listed criteria can have overlays of respective nominal pressures or nominal pressure patterns which result in a total nominal pressure.

BRIEF DESCRIPTION OF THE DRAWING

For an additional explanation of the invention, the description has a drawing attached to it. It schematically shows a shift scheme for execution of the inventive control method.

DETAILED DESCRIPTION OF THE PREFERRED EMBODIMENTS

In the sole drawing, the presented shift system, for instance a pneumatic shift system for shifting an automatic shift transmission for commercial vehicles, is supplied with pressure means through a pressure means supply system, in the vehicle, which comprises of a pressure supply container 2.

In this case, the shift system comprises, for instance, a main cut-off valve 4, configured after the pressure means supply container 2, which can connect or disconnect this sequential shift configuration with the pressure means supplied container 2. It is here also noted that several, parallel positioned main cut-off valves can be provided instead of the main cut-off valve 4.

In the presented case, the subsequent shift configuration comprises, among other things, two positioning cylinders 6 and 8 whereby, for instance, the first positioning cylinder 6 is a double-functioning positioning cylinder, for selecting a gear step or a shift path, and the second positioning cylinder 8 is a one-side acting positioning cylinder for a transmission brake.

The two pressure chambers 9 or 11, respectively, of the first positioning cylinder 6 are each filled by means of an assigned 3/2 way valve 10 or 12, respectively, or vented via a pressure means outflow pipe 14, while the sole pressure chamber 13, of the second positioning cylinder 8, is filled by means of a 2/2 way valve 16 and vented, via a pressure means outflow pipe 14, by means of a 2/2 way valve 18. The way valves 10 and 12 are also designated as shift valves and the way valves 16 and 18 as ventilation or venting valves, respectively.

The shift system further comprises a third, single side functioning positioning cylinder 20, which serves for activation of a transmission clutch. The sole pressure chamber 21, of the third positioning cylinder 20, is filled via a 2/2 way valve 22 and vented via a 2/2 way valve 24, via the pressure means outflow pipe 14. The way valve 22, for filling the clutch positioning cylinder 20, has a check valve 26 positioned in front of it to avoid, during a drop in the pressure supply, venting of the clutch positioning cylinder 20.

The way valves, 12, 16, 18, 22, 24 and, in particular, the main cut-off valve 4, which are assigned to the positioning cylinders, are controlled via a control device, for better clarity not shown here, which is triggered in a way that the above mentioned task is solved, meaning that the supply pressure in the system is matched, during a transmission shifting, in accordance with the listed criteria. Following the main cut-off valve 4, a pressure sensor 28 determines the nominal pressure in the shifting configuration and transmits the respective signal to the control device.

REFERENCE CHARACTERS

2 Pressure Means Supply Container
4 Main Cut-Off Valve
6 Positioning Cylinder
8 Positioning Cylinder
10 3/2 Way Valve
11 Pressure Chamber
12 3/2 Way Valve
13 Pressure Chamber
14 Pressure Means Outflow Pipe
16 2/2 Way Valve
18 2/2 Way Valve
20 Positioning Cylinder
21 Pressure Chamber
22 2/2 Way Valve
24 2/2 Way Valve
26 Check Valve

The invention claimed is:

1. A method of controlling an automated transmission for a motor vehicle comprising at least one pressure activated positioning cylinder (6, 8, 20), having assigned shift valves (10, 12), at least one main cut-off valve (4) which is positioned before to the shift valves, and a control device for controlling the shift valves and the at least one main cut-off valve, the method comprising the steps of:
   determining a pressure request for shifting;
   triggering the at least one main cut-off valve depending on the determining pressure request;
   determining, for different shift scenarios of a shift transmission, a nominal pressure or a nominal pressure pattern, respectively, of the shift valves (10, 12) by consideration of at least two of the following criteria:
      a mass to be synchronized with regard to a synchronous rotation speed which needs to be adjusted;
      a desired variable nominal pressure over a synchronization pattern;
      a condition of a tooth-on-tooth position of two gear wheels;
      a shifting of a gear step into neutral;
      a piston position in a respective positioning cylinder;
      a desired piston speed in the positioning cylinder;
      a desired piston acceleration in the positioning cylinder;
      a respective gear step which needs to be shifted; and
      a requirement of substitution functions during problems with nominal functions;
   operating the at least one main cut-off valve (4) in accordance with the nominal pressure or the nominal pressure pattern; and
   weighting the criteria against one another and using the weighted criteria as a basis for predetermined priorities of the shift operation.

2. A method of controlling an automated transmission for a motor vehicle comprising a least one pressure activated positioning cylinder (6, 8, 20), having assigned shift valves (10, 12), at least one main cut-off valve (4) which is positioned before to the shift valves, and a control device for controlling the shift valves and the at least one main cut-off valve, the method comprising the steps of:
   determining a pressure request for shifting;
   triggering the at least one main cut-off valve depending on the determining pressure request;

determining, for different shift scenarios of a shift transmission, a nominal pressure or a nominal pressure pattern, respectively, of the shift valves (10, 12) by consideration of at least one of the following criteria:
- a mass to be synchronized with regard to a synchronous rotation speed which needs to be adjusted;
- a desired variable nominal pressure over a synchronization pattern;
- a condition of a tooth-on-tooth position of two gear wheels;
- a shifting of a gear step into neutral;
- a piston position in a respective positioning cylinder;
- a desired piston speed in the positioning cylinder;
- a desired piston acceleration in the positioning cylinder;
- a respective gear step which needs to be shifted; and
- a requirement of substitution functions during problems with nominal functions;

operating the at least one main cut-off valve (4) in accordance with the nominal pressure or the nominal pressure pattern; and overlaying the criteria with at least one of the respective nominal pressure or the nominal pressure pattern, respectively, so as to result in a total nominal pressure.

* * * * *